(12) United States Patent (10) Patent No.: US 12,490,896 B2
Gros et al. (45) Date of Patent: Dec. 9, 2025

(54) MEDICAL EXAMINATION DEVICE

(71) Applicant: BMG (BRITISH MEDICAL GROUP) LIMITED, Cambridge (GB)

(72) Inventors: Rob Gros, Cambridge (GB); Mark Wilkinson, Cheshire (GB); Russell Millard, Charlton Adam (GB)

(73) Assignee: SANITAS HEALTHCARE LIMITED, Cambridge (GB)

( * ) Notice: Subject to any disclaimer, the term of this patent is extended or adjusted under 35 U.S.C. 154(b) by 329 days.

(21) Appl. No.: 17/801,655

(22) PCT Filed: Feb. 24, 2021

(86) PCT No.: PCT/EP2021/054518
§ 371 (c)(1),
(2) Date: Aug. 23, 2022

(87) PCT Pub. No.: WO2021/170626
PCT Pub. Date: Sep. 2, 2021

(65) Prior Publication Data
US 2023/0137933 A1 May 4, 2023

(30) Foreign Application Priority Data
Feb. 25, 2020 (EP) .................................... 20159343

(51) Int. Cl.
*A61B 1/267* (2006.01)
*A61B 1/00* (2006.01)
(52) U.S. Cl.
CPC .......... *A61B 1/267* (2013.01); *A61B 1/00052* (2013.01); *A61B 1/00101* (2013.01); *A61B 1/00103* (2013.01)

(58) Field of Classification Search
CPC ...... A61B 1/267; A61B 1/2673; A61B 1/2676
See application file for complete search history.

(56) References Cited

U.S. PATENT DOCUMENTS 5,571,071 A * 11/1996 Shapiro .................. A61B 1/267
600/187
7,946,981 B1 * 5/2011 Cubb .................. A61B 1/00103
600/187
(Continued)

FOREIGN PATENT DOCUMENTS

| CH | 710367 A2 * | 5/2016 | ............. A61B 1/267 |
| CN | 107847120 A | 3/2018 | |

(Continued)

OTHER PUBLICATIONS

Canadian Intellectual Property Office (CIPO); Office Action; Dated: Feb. 27, 2024; pp. 1-5.
(Continued)

*Primary Examiner* — Julianna N Harvey
(74) *Attorney, Agent, or Firm* — Taft Stettinius & Hollister LLP; Stephen F. Rost (57) ABSTRACT

The present invention provides a two piece, single use, medical examination device comprising: a high resolution endo-scope camera and a single use body, wherein the body comprises i) a handle portion for gripping ii) a blade portion for introducing into a patient, and iii) a portion for detachably coupling to a mobile display device; wherein the endoscope camera is fixed within the body, and wherein the body is made of a single material, wherein the material is one of polyethylene, polypropylene, nylon, polystyrene, high impact polystyrene (HIP), polyurethane, polycarbonate, acrylonitrile butadiene styrene, thermoplastic elastomer, acrylic, or polyester.

11 Claims, 9 Drawing Sheets

(56) References Cited

U.S. PATENT DOCUMENTS

| | | | |
|---|---|---|---|
| 2004/0215061 A1* | 10/2004 | Kimmel | A61B 1/267 600/179 |
| 2011/0065991 A1* | 3/2011 | Sarvazyan | A61B 1/31 600/131 |
| 2011/0130627 A1* | 6/2011 | McGrail | G02B 23/2423 600/109 |
| 2011/0144436 A1* | 6/2011 | Nearman | A61M 16/04 600/188 |
| 2012/0116391 A1 | 5/2012 | Houser et al. | |
| 2014/0066953 A1* | 3/2014 | Keating | A61B 17/3439 606/130 |
| 2014/0254075 A1 | 9/2014 | Schaaf | |
| 2014/0371536 A1* | 12/2014 | Miller | B29C 45/1676 264/250 |
| 2015/0099934 A1* | 4/2015 | Sartore | A61M 16/0486 600/187 |
| 2016/0183766 A1* | 6/2016 | Tsai | A61B 1/00105 600/188 |
| 2016/0256047 A1 | 9/2016 | Newcomb et al. | |
| 2017/0258311 A1* | 9/2017 | Merz | A61B 1/0125 |
| 2017/0303857 A1* | 10/2017 | Perkins | H04N 7/185 |
| 2018/0153389 A1* | 6/2018 | Dixon | A61B 1/267 |
| 2019/0142262 A1 | 5/2019 | Inglis et al. | |
| 2019/0328224 A1 | 10/2019 | Nevin | |
| 2022/0000342 A1* | 1/2022 | Knecht | A61B 1/00048 |

FOREIGN PATENT DOCUMENTS

| | | | |
|---|---|---|---|
| CN | 110139594 A | | 8/2019 |
| EP | 3871584 B1 | | 6/2023 |
| GB | 2538552 A | | 11/2016 |
| GB | 2587234 A | * | 3/2021 ............. A61B 1/267 |
| JP | 2013-512046 A | | 4/2013 |
| JP | 2021-502863 A | | 2/2021 |
| KR | 200479850 Y1 | | 3/2016 |

OTHER PUBLICATIONS

European Search Report, EP20159343.1, European Patent Office, Jul. 28, 2020, 8 pages.
International Search Report & Written Opinion, PCT/EP2021/054518, European Patent Office, May 19, 2021, 11 pages.
Japan Patent Office; Office Action with Translation; Corresponding Application No. 2022-551804; Dated: Nov. 25, 2024; pp. 4.
State Intellectual Property Office, Beijing, CN; First Examination Opinion Notice with Translation; Corresponding Patent Application No. 202180030641.X; Date: May 24, 2025; pp. 1-8.
State Intellectual Property Office, Beijing, CN; Official Notice of Allowance with Translation; Patent Application No. 2022-551804; Mailed: Jun. 20, 2025; pp. 1-2.
Australia IP; Examination Report No. 1 for corresponding application 2021228918; Date of Report: Aug. 29, 2025; p. 4.
(MYIPO) Intellectual Property Corporation of Malaysia; Modified Substantive Examination Adverse Report and Search Report; Corresponding application No. PI 2022004589; Mail date: Sep. 9, 2025; p. 4; Examiner: Nazwin Sazwina Nasruddin.
CNIPA; Chinese Office Action "Decision of Rejection"; Corresponding Application No. 202180030641.X; Date: Sep. 2, 2025; p. 7.

* cited by examiner

MEDICAL EXAMINATION DEVICE

This application is a U.S. national stage application under 35 U.S.C. § 371 of PCT International Application Serial No. PCT/EP2021/054518 which has an international filing date of Feb. 24, 2021, designates the United States of America, and claims the benefit of EP Application Serial No. 20159343.1, which was filed on Feb. 25, 2020. The disclosures of each of these prior applications are hereby expressly incorporated by reference in their entirety.

FIELD OF INVENTION

The present invention relates to a two piece, single use, medical examination device.

BACKGROUND ART

Best clinical practice requires direct visualisation of medical procedures as mandatory. The healthcare market requires high investment methods of visualisation, with high investment consumables, over-complicated infection control measures, including sterilisation, and separate battery source that requires disposal.

One field of clinical usage is video laryngoscopy as a medical procedure for assisting endotracheal intubation. Video laryngoscope monitors typically contribute very substantially to the overall cost of anaesthesia, as do the video laryngoscope consumables.

In 2018, a policy statement from the Association of Anaesthetists of Great Britain and Ireland directs to video laryngoscopy where possible. Despite aspiring to best practice, evidence demonstrates video laryngoscopy accounts for 8% of General Anaesthetic procedures and has a disproportionate and an escalating recurring consumable cost.

WO2018/127759 discloses a video laryngoscopy accessory for a mobile communication device. While it states that it is possible for the accessory to be for a single use, the material of the body of the accessory must be sterilisable and durable for re-use. The described device also has numerous moveable parts, as well as being made of multiple pieces, hence is more susceptible to breakage.

There is therefore a need to provide a more cost effective, efficient and breakage resistant apparatus for visualising medical procedures which is straightforward to use and manufacture.

SUMMARY OF THE INVENTION

The present invention provides a two piece, single use, medical examination device comprising:
  a high resolution endoscope camera and a single use body,
    wherein the body comprises
    i) a handle portion for gripping
    ii) a blade portion for introducing into a patient, and
    iii) a portion for detachably coupling to a mobile display device;
  wherein the endoscope camera is fixed within the body, and wherein the body is made of a single material, wherein the material is one of polyethylene, polypropylene, nylon, polystyrene, high impact polystyrene (HIP), polyurethane, polycarbonate, acrylonitrile butadiene styrene, thermoplastic elastomer, acrylic, or polyester.

DETAILED DESCRIPTION

The present invention relates to an endoscope presented with a high resolution camera, connected to a mobile device to display real-time patient images (still or live video) close to the line of sight of the operator. The invention is presented in a disposable body, with a portion for detachably coupling to a mobile device which firmly holds it in place. The body of the invention defines a channel to secure the camera in a contamination-free environment and to optimise the camera position for the organ to be investigated.

The benefit of such an arrangement of all components is characterised by the low cost and low environmental impact. In particular being a metal free disposable body is advantageous with respect to waste disposal by providing a single material waste stream. This enables mass disposal or recycling of the body, and therefore a clear cost reduction and increased control on environmental impact. It has also been found that the metal free nature means the product is lighter, does not interfere with any other medical instruments in use, and avoids any conduction or radiation side effects. Hence, the device is easier to use and safer in its operation.

The device may be any appropriate for medical examination and requiring recordal of an image. Preferably, the device is an otoscope, laryngoscope or proctoscope, or other devices for nasal, gastric, bronchial or sigmoidal examination. As well as for human examination, the device can also be used for veterinary examination of animals.

The endoscope camera of the invention is of high resolution, hence 1 k or above. Preferably it is in the range of 1 to 2 k resolution, most preferably 1.5 k. Resolution of for example 4 k or higher is more costly with limited additional clarity. Consequently, manufacturing cost of the device as a whole is reduced. The camera lens is also preferably polished and less than 1 mm in thickness to prevent refraction of image transfer.

The camera is preferably linked by a cable to the mobile display device and is housed within the body portion of the device. The length of the cable varies according to procedure. The link between the camera and mobile display device is preferably a USB connection, for example mini USB, micro USB, USB C or Lighting type. Preferably the camera is powered by the mobile display device, and most preferably only by the mobile display device. This therefore avoids the need for other power sources such as batteries which come with their own disposal problems, as well as adding to the cost. As such, the present invention is capable of meeting the requirements of Waste Electronic and Electrical Equipment (WEEE) guidelines and EU legislation with respect to battery waste.

Preferably the camera comprises an integrated light ring 7 surrounding the camera lens. The unexpected benefit of such a feature is that low heat generated by an LED ring obviates any defogging requirement, and also removes the requirement for a lens cover built into the body i.e. no lens cover separate from the camera is required. Therefore, preferably there is no additional barrier between the camera and the patient. Additional barriers may compromise the fidelity of the displayed image. This is a further advantage of the present invention.

The single use body of the invention comprises a handle portion for gripping, a blade portion for introducing into the patient and a portion for detachably coupling to a mobile display device. As mentioned the body is metal free to provide a lighter, easier to dispose or recycle and safer device, minimising risk of interference with other medical instruments in use. Preferably the body made of one of polyethylene, polypropylene, nylon, polystyrene, polyurethane, polycarbonate, acrylonitrile butadiene styrene, thermoplastic elastomer, acrylic, or polyester. Most preferably the body is made entirely of polyethylene or polypropylene or polystyrene or high impact polystyrene (HIP), hence simple to manufacture, already clinically clean (i.e. free from foreign bodies, dirt and grease), and straightforward for disposal or recycle. It has been realised by the present inventors that using just one material also results in a smoother surface for all areas of potential patient contact, hence minimising patient distress. Operation and subsequent mobile display visualisation is also less susceptible to any interference or impairment due to the uniformity of the material used. Due to its uniformity of content, a single material surprisingly provides a more rigid device. Polypropylene, in particular medical grade polypropylene, such as Bormed, is the single most preferred material of the present invention.

The body will typically have no moving parts once the two pieces of the body are fixed together, and the blade will typically be integrated with the handle portion, but in an embodiment the blade may be detachable. The body may comprise two halves linked by a hinge 5 which are not moveable once the halves are closed. Additionally or alternatively the two halves may be press or snap fitted together. The body may also comprises a double wall of tongue-and-groove seals 6 that forms an internal channel to house the endoscope camera and cable in an infection-free cavity. Such structures render the body easy to manufacture and also stronger upon construction and in use, and with less susceptibility to breakage.

The handle portion will preferably comprise a ribbed structure, preferably an internal ribbed structure with finger grooves for easier gripping by the user. The handle portion being ribbed allows for increased manouverability of the device during medical examination as well as greater stability. The blade portion may also have a thinner profile at its tip. In other words the profile is wider away from its tip or in the middle or central section of the blade portion. This also contributes to the above identified technical effects. The ribs of the present invention are structural and positioned to optimise strength of the device, as well as minimising weight. The selected density of the ribs at the angle between the blade and handle portions have the unexpected benefit of conferring the maximum breaking strain on the device, removing the risk to both user and patient of breakage during normal use. Preferably, there are between 10 and 25 ribs, more preferably between 14 and 20 ribs.

The ribbed body as shown in the Figures was tested to find its failure point. The failure point in this case was determined by either breakage or disengagement of the clip elements holding the body together. The maximum force that could be applied was around 192 Newtons. Even at this force the device didn't break. Rather, it was no longer usable. A standard laryngoscope can withstand a maximum force at 150 Newtons according to international standards, such as ISO 7376. Hence this is an unexpected benefit because of the rib structure offering significant extra strength far above and beyond current models on the market.

Preferably the body has a minimum break force in the range of 150 to 300 Newtons, and preferably greater than 150 Newtons (i.e. it can withstand up to 150 Newtons), more preferably greater than 190 Newtons, and/or maximum mass of the body is 75 g or more preferably 55 g, for most efficient use and patient safety. The maximum mass of the body can be 100 g or less, for example 75 g or less, or 55 g or less. A preferred range is for example 40 to 60 g.

The blade can be any suitable size, including being a suitable size for paediatrics or small adults.

The body portion of the device further comprises a portion for detachably coupling to the mobile display device. Preferably this portion comprises an integrated clip which allows for secure holding of the display device against a recess at the head of the device. Such a spring clip or bracket holder can comprise notches to allow for different size mobile display devices or different depth positioning. Otherwise, the clip can be a press clip which presses against a corresponding portion of the mobile phone to secure its positioning. In an embodiment such a clip can be integral or a separate piece.

The mobile display device according to the present invention is preferably a mobile telephone or tablet. Preferably the overall device of the present invention is provided with such a display device, hence the end user is not required to use their own device. This maintains the medically sterile environment as well as ease of use with a consumer device that is familiar to use. Preferably the device falls within safety and compliance standards such as IEC 60601.

The universality of mobile devices ensures immediate user familiarity, enhancing ease of learning, therefore reducing patient risk of lack of error in use. Preferably this is capable of running applications ('apps'). The mobile display device can be supplied with a pre-loaded application to transmit images to the display device screen, and for image data processing to compile contour and boundary definition, with environment recognition of signpost investigation or intubation landmarks provided by the image data stream. Additional features may include diagrammatic instructions for use and training videos. The application may also be presented with a facility to synchronize data to append to patient and hospital records.

The display device displays an indirect image from information collected and transported by the electronic endoscope lighting connector/USB or other port. The display device is preferably not supplied with a SIM card, to prevent phone usage and to protect patient confidentiality. A mobile telephone is preferable as it presents optimal size and definition of screen, familiarity and ease of use, cost effectiveness, with the application, continual evolution for clinical analysis. Overall, this permits patient analysis and clinical interpretation of images to be conducted in real time, or recorded for subsequent analysis or appendment to patient records. The invention is lightweight and portable, intuitive with simple instructions, affording convenience of use. The present invention further removes the requirement of alternate embodiments that alternate between direct and indirect views, between adjacent and remote display screens, or that emphasise inhibiting hand positions on the grip, thereby compromising the degree of control available.

As well as providing imaging, the mobile display device can also be used to record sound. Hence, beneficially it provides the ability to monitor comments made by the operator as well as environmental sounds. In this respect, the user of the device is afforded the ability to make audio notes as the medical examination procedure is ongoing. Additionally, they are able to record audio notes subsequent to the examination for example to summarise the examination or identify points of improvement for future examinations. In this way, the operator is afforded a way to continuously monitor the procedure and identify potential improvements of the medical examination device. This audio recording feature is not present in devices currently on the market, and is a feature of using a mobile communication device as the display element of the video laryngoscope system in accordance with the present invention.

Overall, the device of the present invention provides a balanced centre of gravity, against relatively large and bulky devices on the market where the centre of gravity in usage makes viewing harder to manoeuvre than traditional devices. The embodiment of the invention demonstrates that during manipulation and lateral articulation of the blade from an initial insertion into the patient site for examination to a final blade position for examination or assisting intubations of the patient, the screen is positioned close to the line of sight of the operator and is configured at an acute angle to the perpendicular, to optimise operator visibility, as site of investigation is inevitably lower than the operator. The present invention optimises in-procedure simplicity. Preferably, the portion for detachably coupling to a mobile display device is configured to couple centrally with the mobile display device i.e. so that the mobile display device is held at a central position, for example as shown in FIGS. 1 and 4 to 7. Typical laryngoscope devices have a right hand or left hand bias. By the display device being positioned centrally for viewing, the display can also be suitable for left-hand or right-hand use.

The Figures of the present invention show different views of a device according to the present invention, comprising the body with a ribbed handle portion 1, a blade portion 2, a coupling portion 4 for detachably coupling to a mobile display device 5, the body housing the endoscope and the high resolution camera 3, as well as the cable connecting this to the mobile display device 5. The cable ends with a moulded housing that sites the endoscope camera in position for optimum visibility, and that is covered by a sealed lens to maintain zero contamination risk.

Figure 1:
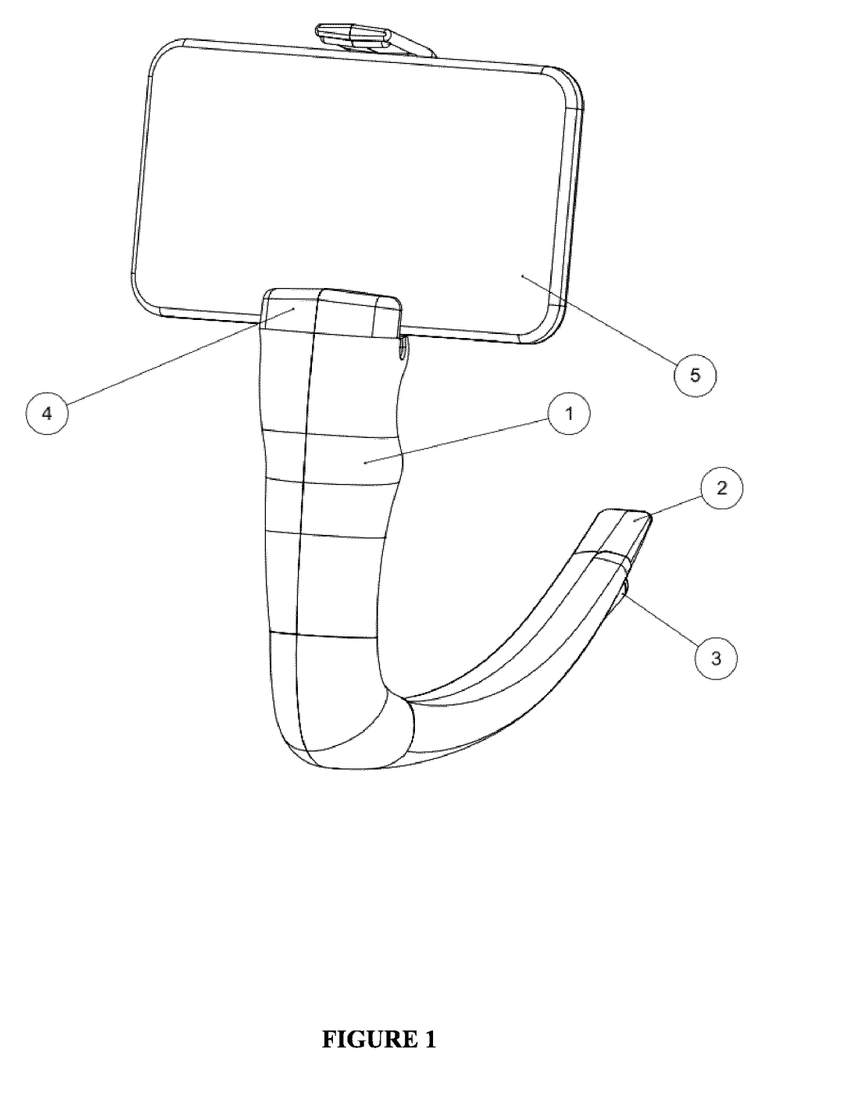
FIG. 1 is a perspective view of a laryngoscope device according to the present invention when coupled to a mobile display device.
Figure 2:
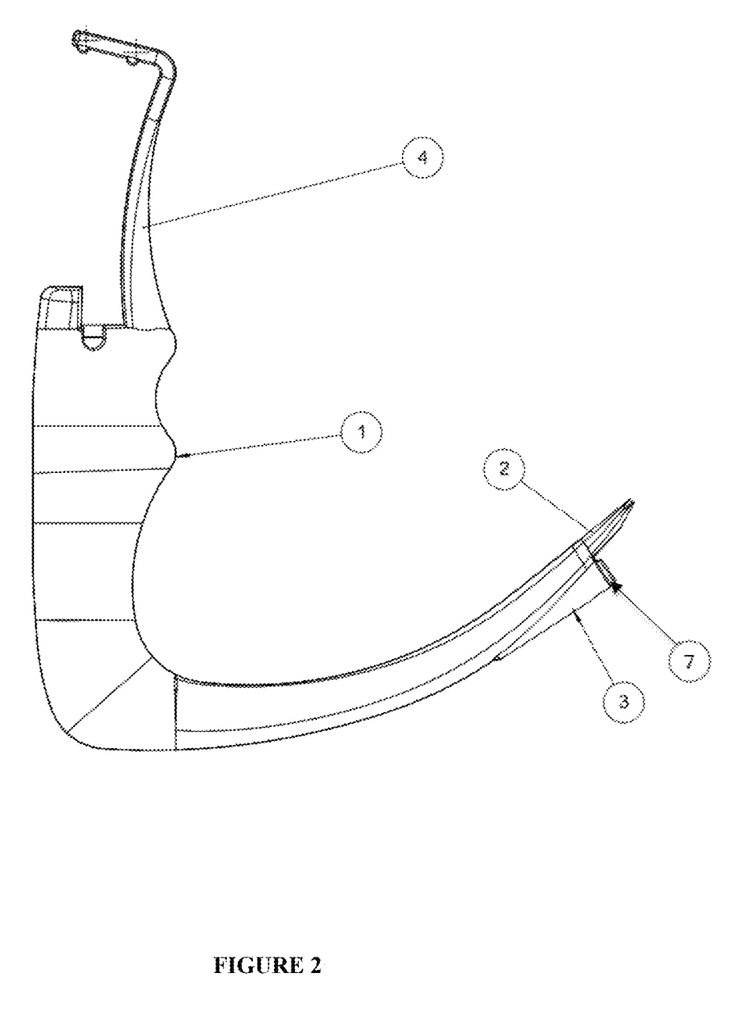
FIG. 2 is a side profile view of a laryngoscope device according to the present invention.
Figure 3:
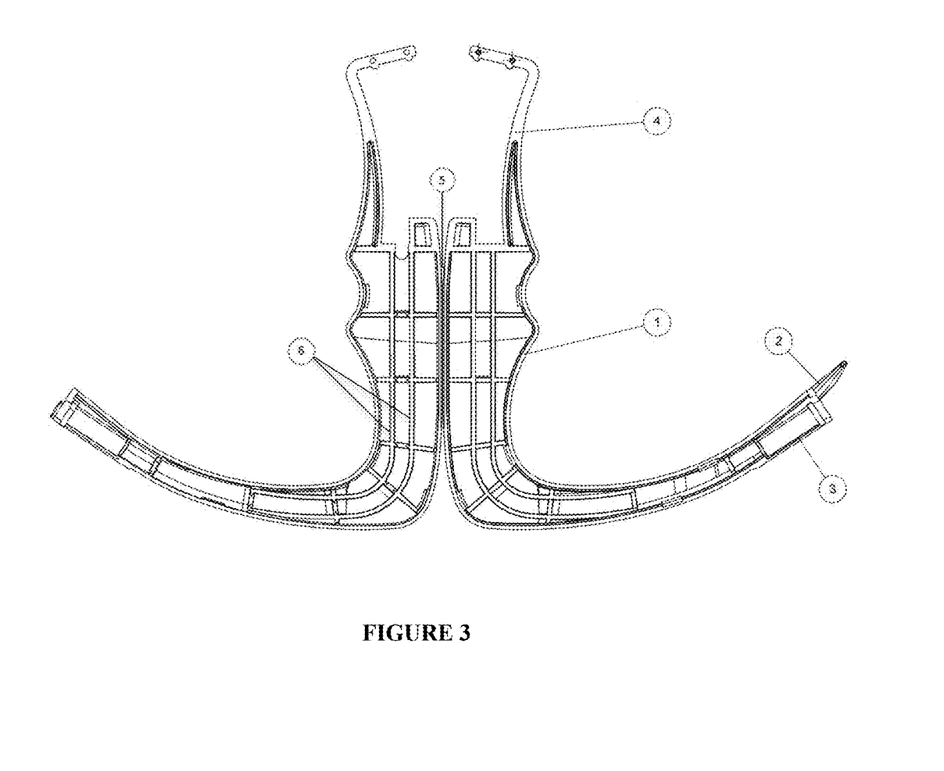
FIG. 3 is front view of the two opened halves of a laryngoscope device according to the present invention.

FIG. 3 shows the device in an open position two halves of the body which can be opened to safely remove the endoscope camera and cable before disposal of the body. Upon closure of the two halves the cable and endoscope camera are housed within a sealed and contamination free environment.

Figure 4:
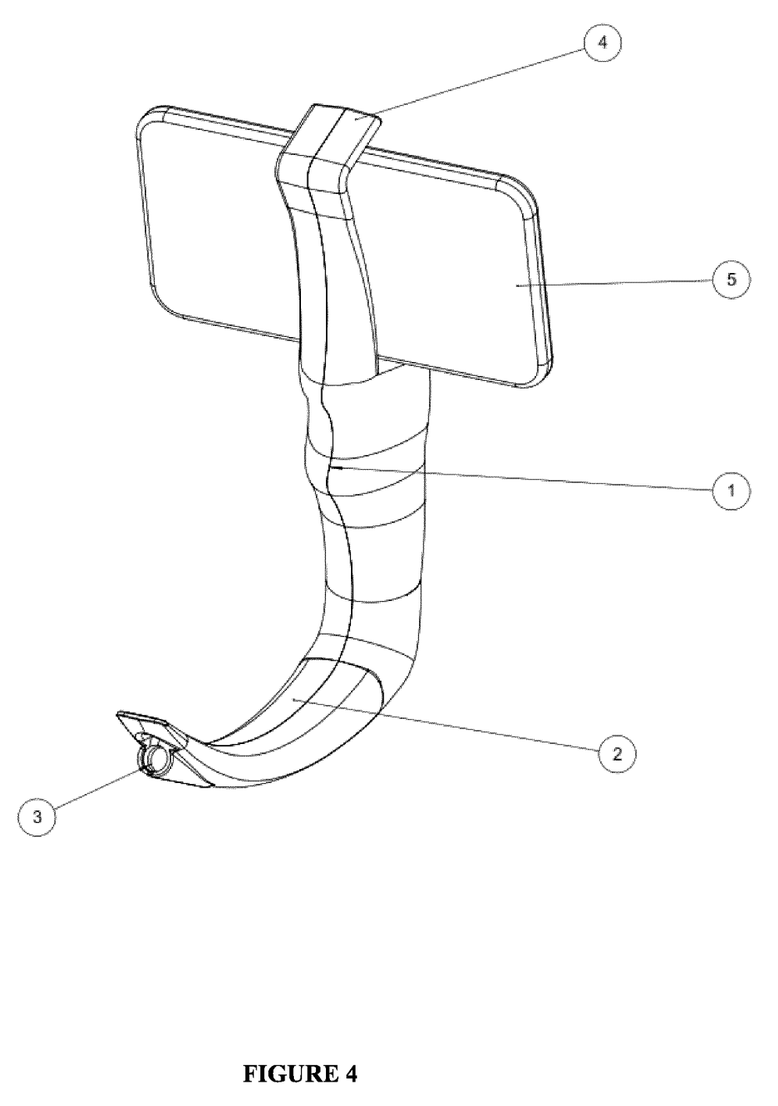
FIG. 4 is a rear diagonal cross sectional view of a laryngoscope device according to the present invention coupled to the mobile display device by an integrated sizeable spring clip.
Figure 5:
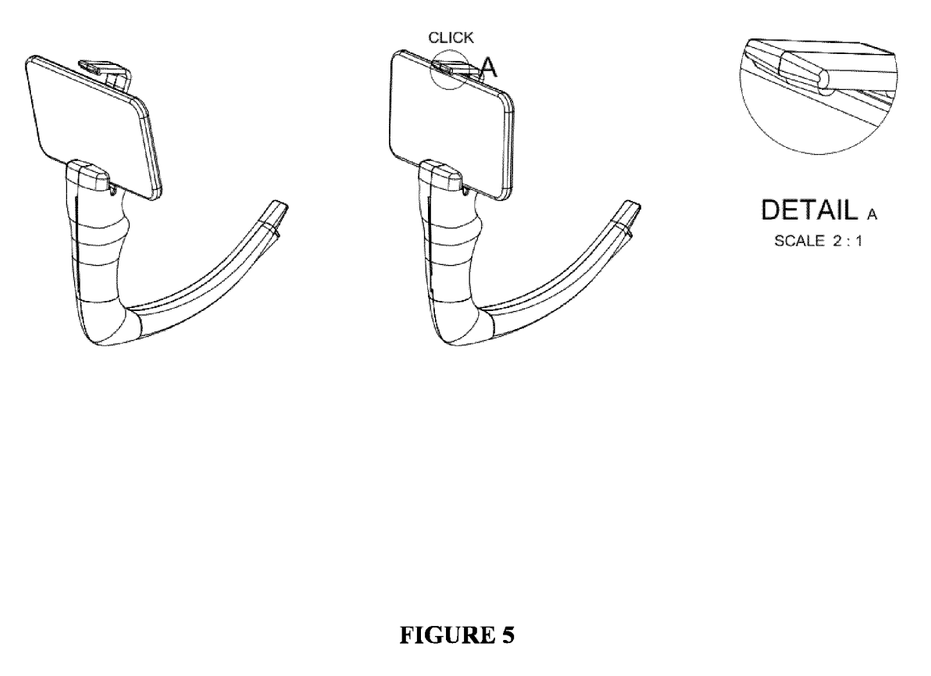
FIG. 5 shows the mobile phone attachment mechanism using a spring clip.
Figure 6:
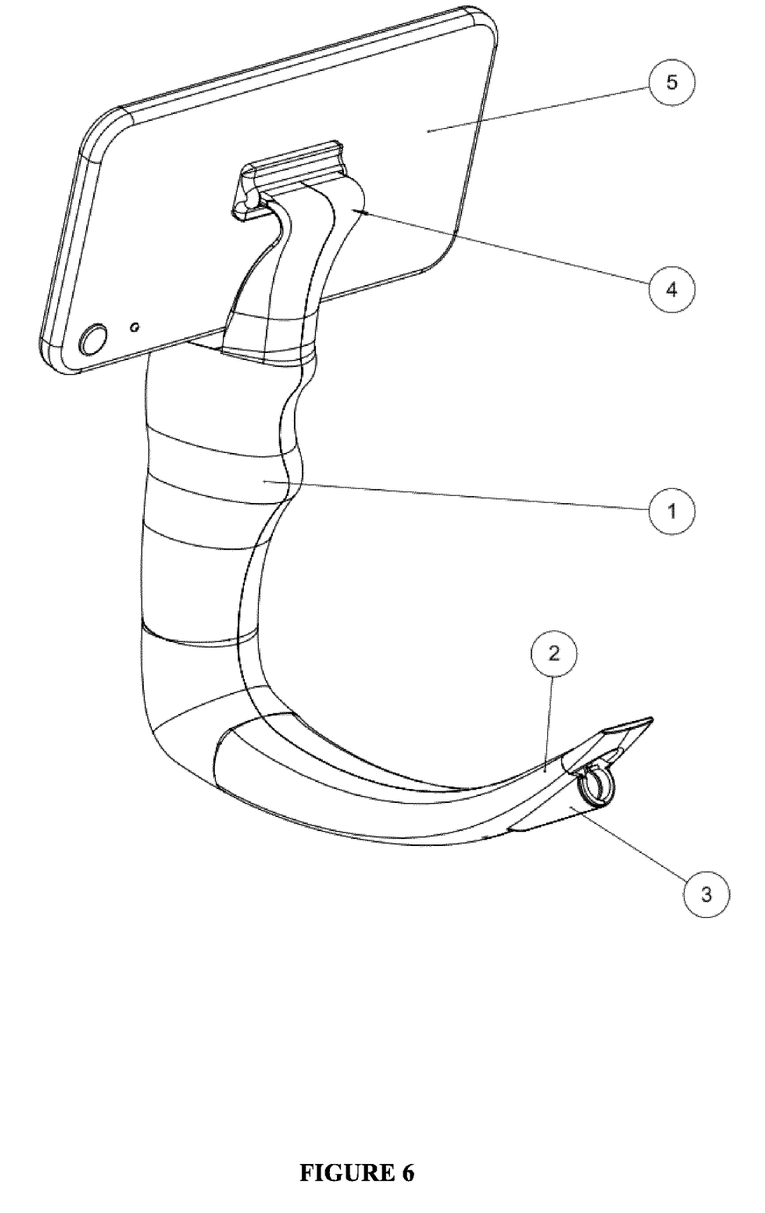
FIG. 6 is a rear diagonal cross sectional view of a laryngoscope device according to the present invention detachably coupled to the mobile display device by a rear press clip.
Figure 7:
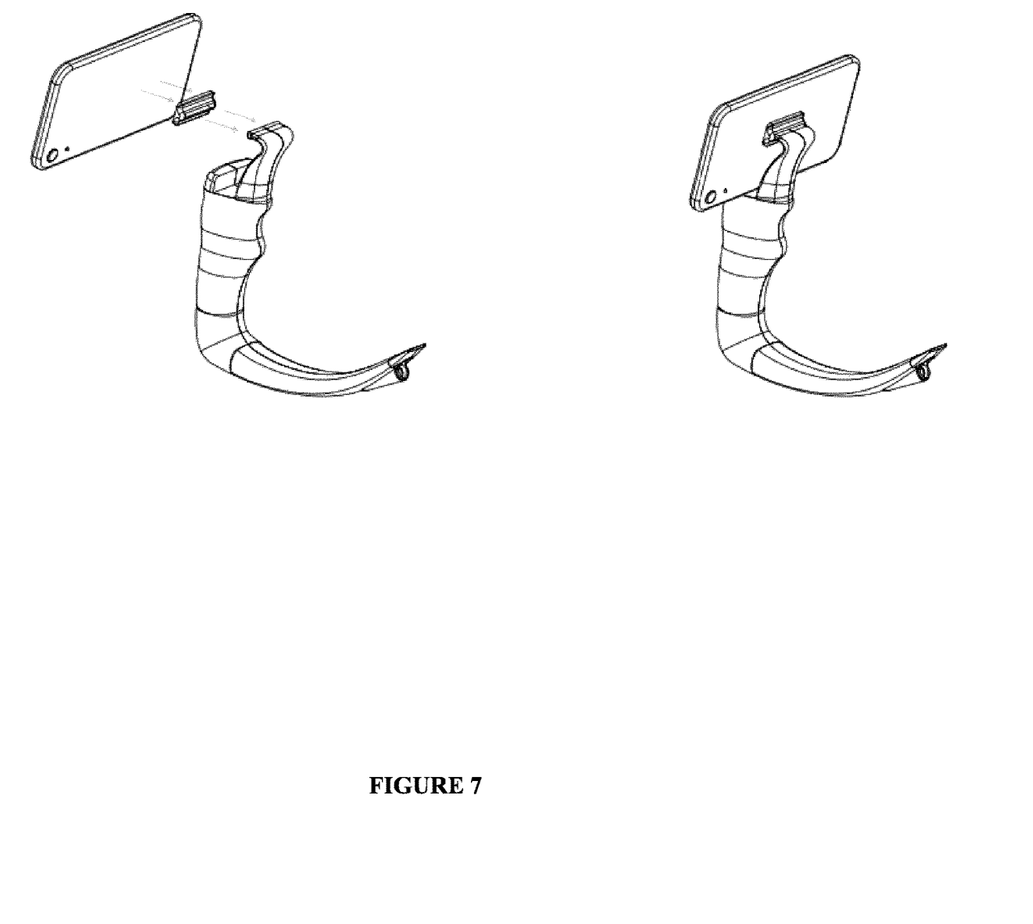
FIG. 7 shows the mobile phone attachment mechanism using a separate press clip.
Figure 8A:
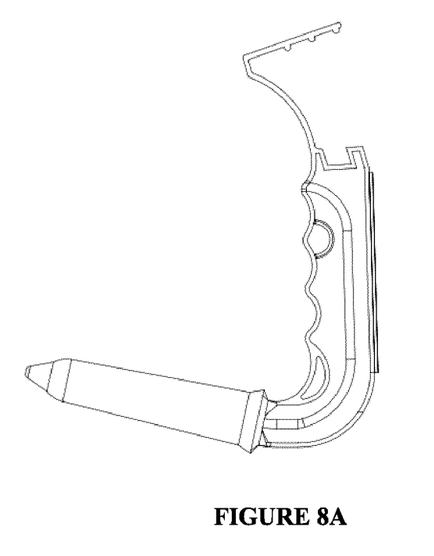
FIGS. 8A-8D show a proctoscope device according to the present invention.
Figure 8B:
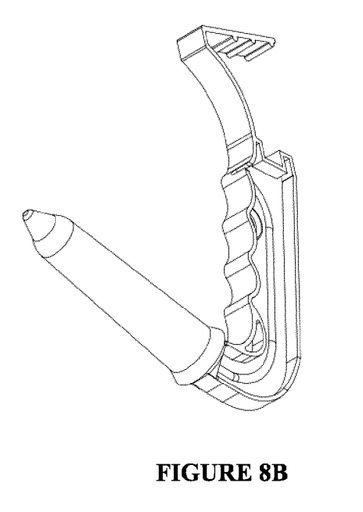
Figure 8C:
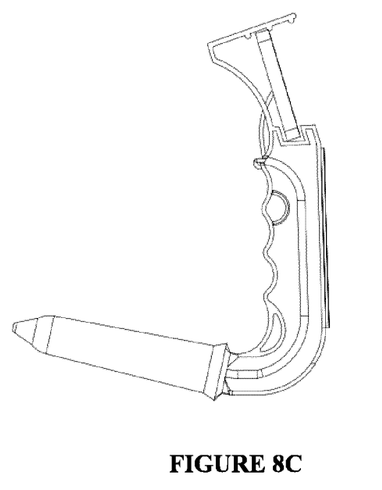
Figure 8D:
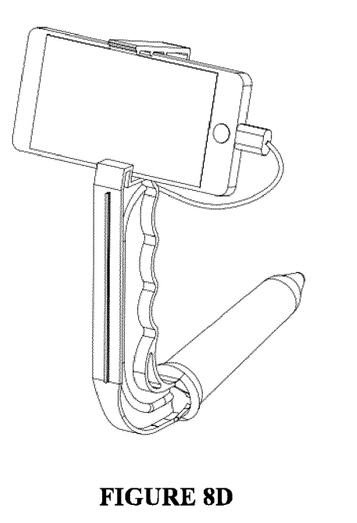
Figure 9A:
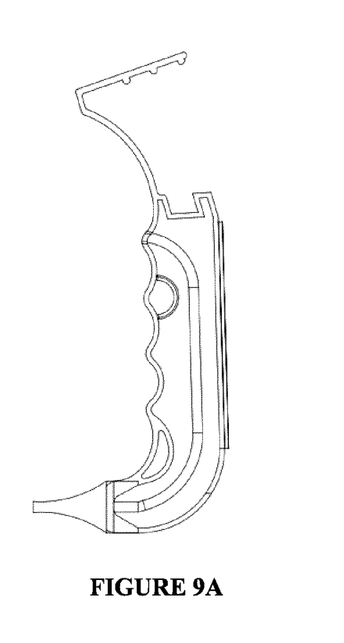
FIGS. 9A-9C show an otoscope device according to the present invention.
Figure 9B:
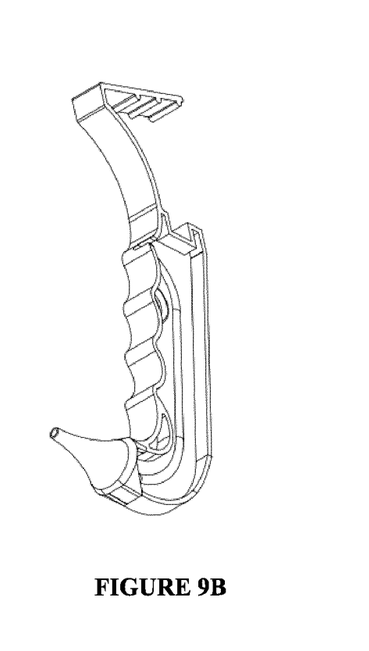
Figure 9C:
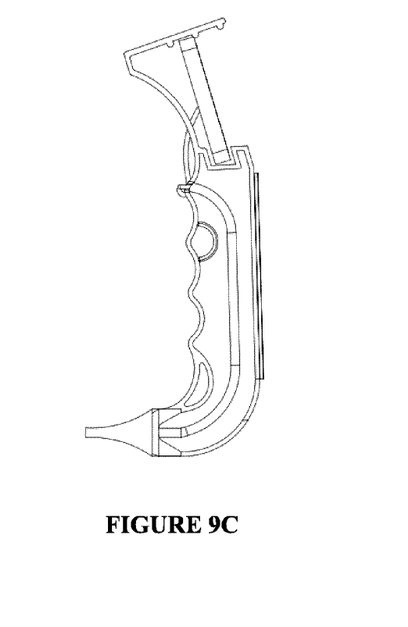

FIG. 4 shows a sizeable integrated spring clip which uses notches as shown to allow for different sized mobile display devices to be used, or to vary the depth positioning of the mobile phone. The spring clip is configured at an acute angle to the perpendicular, to optimise operator visibility, as site of investigation is inevitably lower than the operator. FIG. 5 shows the spring clip or bracket holder attachment mechanism. FIG. 6 shows a press clip which attaches to the back of the mobile display device, which can itself be a separate detachable clip. FIG. 7 shows a press clip attachment mechanism.

FIGS. 8A-D and 9A-C show various perspectives of a proctoscope device and an otoscope device respectively according to the present invention, again clearly showing the advantageous ribbed body structure, the clip fit arrangement for mobile phone attachment, and one piece housing arrangement for the endoscope.

The invention claimed is:

1. A single use, medical examination device comprising:
a single use body, wherein the body comprises
i) a handle portion for gripping,
ii) a blade portion for introducing into a patient, and
iii) a portion for detachably coupling to a mobile display device, wherein the portion for detachably coupling to the mobile display device comprises an integrated clip;
wherein, the body is configured to house a high resolution endoscope camera, and wherein the body is made of a single material that comprises one of polyethylene, polypropylene, nylon, polystyrene, high impact polystyrene (HIP), polyurethane, polycarbonate, acrylonitrile butadiene styrene, thermoplastic elastomer, acrylic, or polyester; and
wherein the handle portion, the blade portion and the portion for detachably coupling to the mobile display comprising the integrated clip comprise two halves linked by a hinge, or wherein the handle portion, the blade portion and the portion for detachably coupling to the mobile display comprising the integrated clip comprise two halves press or snap fitted together.

2. The device according to claim 1, wherein the device is a laryngoscope, proctoscope or otoscope.

3. The device according to claim 1, wherein the polypropylene is Bormed polypropylene.

4. The device according to claim 1, wherein the body comprises no moveable parts.

5. The device according to claim 1, wherein the body comprises internal structural ribs within the body, wherein the ribs are positioned to optimise strength of the device.

6. The device according to claim 1, wherein the device comprises a double wall of tongue-and-groove seals that forms an internal channel to house the endoscope camera and cable in an infection-free cavity.

7. The device according to claim 1, further comprising a mobile display device.

8. The device according to claim 7, wherein the display device is a mobile telephone or tablet capable of running an application.

9. The device according to claim 7, wherein the mobile display device is configured to contemporaneously capture audio records in addition to recording images.

10. The device according to claim 1, further comprising a high resolution endoscope camera.

11. The device according to claim 10, further comprising a display device, wherein the display device is the only power source for the endoscope camera.

* * * * *